United States Patent [19]

Matsushita et al.

[11] Patent Number: 4,874,973
[45] Date of Patent: Oct. 17, 1989

[54] METHOD AND ARRANGEMENT FOR SECURING A PULLEY TO A ROTOR IN AN ELECTROMAGNETIC CLUTCH

[75] Inventors: Takashi Matsushita; Genzo Yanai, both of Isesaki, Japan

[73] Assignee: Sanden Corporation, Gunma, Japan

[21] Appl. No.: 201,904

[22] Filed: Jun. 3, 1988

[30] Foreign Application Priority Data

Jun. 5, 1987 [JP] Japan ............... 62-140081

[51] Int. Cl.$^4$ .................. H02K 7/10; F16D 27/04
[52] U.S. Cl. ........................ 310/78; 310/92; 310/100; 192/84 C; 474/168
[58] Field of Search ............ 192/84 C; 474/168, 170, 474/902, 903; 310/78, 92, 100

[56] References Cited

U.S. PATENT DOCUMENTS

| | | | |
|---|---|---|---|
| 4,226,134 | 10/1980 | Sohnle | 474/903 |
| 4,287,976 | 9/1981 | Sakaki et al. | 192/84 C |
| 4,425,520 | 1/1984 | Hiraga | 310/78 |
| 4,449,622 | 5/1984 | Okano et al. | 310/78 |

Primary Examiner—Patrick R. Salce
Assistant Examiner—Emanuel T. Voeltz
Attorney, Agent, or Firm—Banner, Birch, McKie & Beckett

[57] ABSTRACT

An electromagnetic clutch includes a clutch rotor and an annular electromagnet. The clutch rotor has a rotor which sectional side view is a U-shaped configuration and a pulley mounted at an outer peripheral surface of the rotor. The annular electromagnet is disposed in an annular cavity of the rotor. An armature plate facing to a front end surface of the rotor is supported elastically by a stopper plate through a plurality of leaf springs. The stopper plate is fixed to an outer end of a drive shaft. First engaging elements are formed at an outer peripheral surface of the rotor. Second engaging elements are formed at an inner peripheral surface of the pulley. The first and second engaging elements are complementary and prevent the relative rotational motion of the pulley and the rotor when engaged. A stopper provided on the outer peripheral surface of the rotor prevents the relative axial movement of the pulley and the rotor.

11 Claims, 7 Drawing Sheets

METHOD AND ARRANGEMENT FOR SECURING A PULLEY TO A ROTOR IN AN ELECTROMAGNETIC CLUTCH

BACKGROUND OF THE INVENTION

This invention generally relates to an electromagnetic clutch, and more particularly, relates to an arrangement and a method for use with an electromagnetic clutch for securing a pulley to an outer peripheral surface of a rotor.

FIG. 1 illustrates an electromagnetic clutch 20 in accordance with the prior art. A front housing 11 of a refrigerant compressor rotatably supports a drive shaft 12 by means of a needle bearing 13. Needle bearing 13 is disposed in an inner peripheral wall of an opening 14 which is formed at the center of front housing 11. An annular axial projection 15 surrounds drive shaft 12 and projects from the front end surface of front housing 11. A shaft seal assembly 16 is disposed in the cavity formed by annular axial projection 15. Electromagnetic clutch 20 includes a clutch rotor 21, an annular electromagnet 22 and an armature plate 23. Clutch rotor 21 includes a rotor 211 having a U-shaped cross-sectional configuration and a pulley 212 attached at the outer peripheral surface of rotor 211. Clutch rotor 21 is rotatably supported on the outer peripheral surface of annular axial projection 15 through a ball bearing 17. Annular electromagnet 22 is disposed in an annular cavity 211d of rotor 211 and is attached to the front end surface of front housing 11 by an annular member 18. A stopper plate 121, fixed at an outer end of drive shaft 12 by a nut 122, supports an elastic armature plate 23 through a plurality of leaf springs 24.

In such an electromagnetic clutch, clutch rotor 211 rotates in response to a power source (not shown), e.g., an engine of an automobile, through a belt (not shown) which is engaged between a pulley 212 of clutch rotor 21 and the power source. Armature plate 23 is attracted to clutch rotor 21 when electromagnet 22 is energized. As a result, drive shaft 12 is driven by the rotation of the power source.

In general, pulley 212 may be secured to rotor 211 by electron beam welding, $CO_2$ welding or shrinkage fit by heating.

With electron beam welding, pulley 212 is first mounted on the outer peripheral surface of rotor 211. Then, electron beam 31 is directed on the circumferential surface of the bottom portion of pulley 212 as shown in FIG. 2 so as to weld the pulley to the rotor.

With $CO_2$ welding, pulley 212 is again first mounted on the outer peripheral surface of rotor 211. Then, the outer lower surface of pulley 212 is welded to the outer peripheral surface of the rotor as shown in FIG. 1.

With shrinkage fit, pulley 212 is first heated. Next, pulley 212 is mounted on the outer peripheral surface of rotor 211 as pulley 212 is being heated so as to undergo thermal expansion as in FIG. 3. Then pulley 212 shrinks by natural cooling to fit rotor 211.

However, each of the above-described methods for securing the pulley to the rotor has drawbacks. With electron beam welding, the spacing between the walls of grooves 213 is narrowed by heat transformation because of the electron beam as shown in FIG. 4. This may generate unsuitable engagement between grooves 213 of pulley 212 and a belt member (not shown) which engages the grooves. This unsuitable emgagement may damage the belt. In addition, the equipment used in electron beam welding is complicated and makes securing the pulley to the rotor difficult. $CO_2$ welding also requires complicated equipment for securing the pulley to the rotor.

Shrinkage fitting requires a high degree of precision in the dimensions of pulley 212 and rotor 211, especially the inner diameter of pulley 212 and the outer diameter of rotor 211, to effectively secure the pulley to the rotor.

SUMMARY OF THE INVENTION

Therefore, it is an object of the present invention to provide a method and apparatus for securing a pulley to a rotor simply, easily and precisely.

It is a further object of the present invention to provide a method and apparatus for securing a pulley to a motor without the use of a heat source.

This and other important objects are met by the method and apparatus of the present invention.

A method of securing a pulley to an outer peripheral surface of a rotor in an electromagnetic clutch includes the step of forming complementary engaging elements on the rotor and the pulley. Next, the pulley is coupled to the rotor so as to engage the complementary engaging elements and prevent the relative rotational movement of the pulley and the rotor. Finally, a stopper element is formed at the outer peripheral surface of the rotor to prevent the relative axial movement of the pulley and the rotor when the pulley is coupled to the rotor.

An arrangement for use in an electromagnetic clutch for securing a pulley to an outer peripheral surface of a rotor includes complementary engaging elements respectively disposed on the rotor and the pulley to prevent relative rotational movement of the pulley and the rotor when the pulley is coupled to the rotor.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENT

Figure 5:
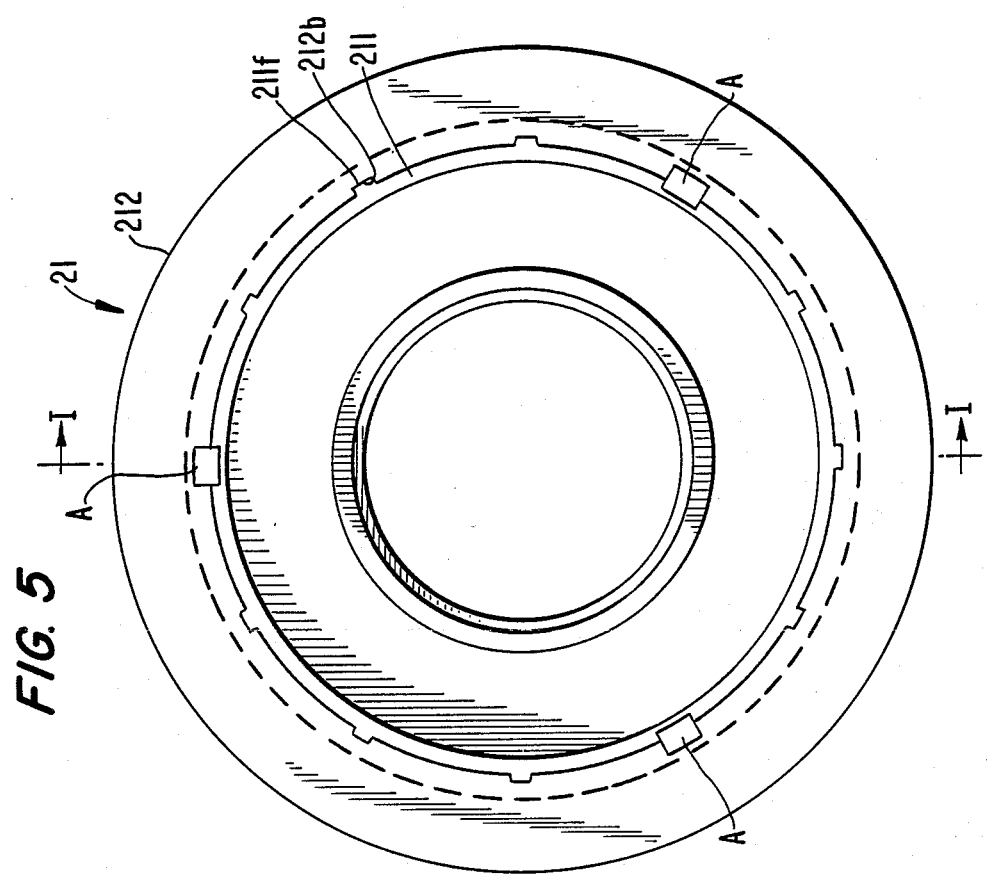
FIG. 5 is a side elevational view of a clutch rotor in accordance with an embodiment of this invention.
Figure 6:
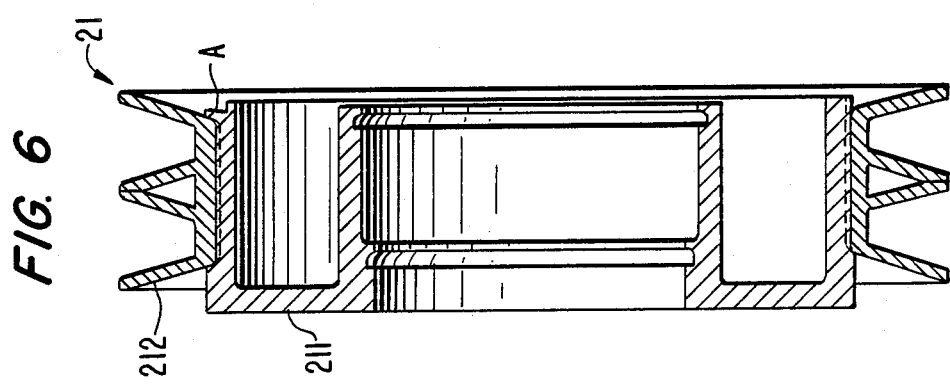
FIG. 6 is a cross-sectional view taken along line I—I of FIG. 5.

FIGS. 5 and 6 illustrate a clutch rotor 21 in accordance with a preferred embodiment of the present invention. Clutch rotor 21 includes a rotor 211 having a U-shaped configuration and a pulley 212 secured at the outer peripheral surface of rotor 211.

Figure 1:
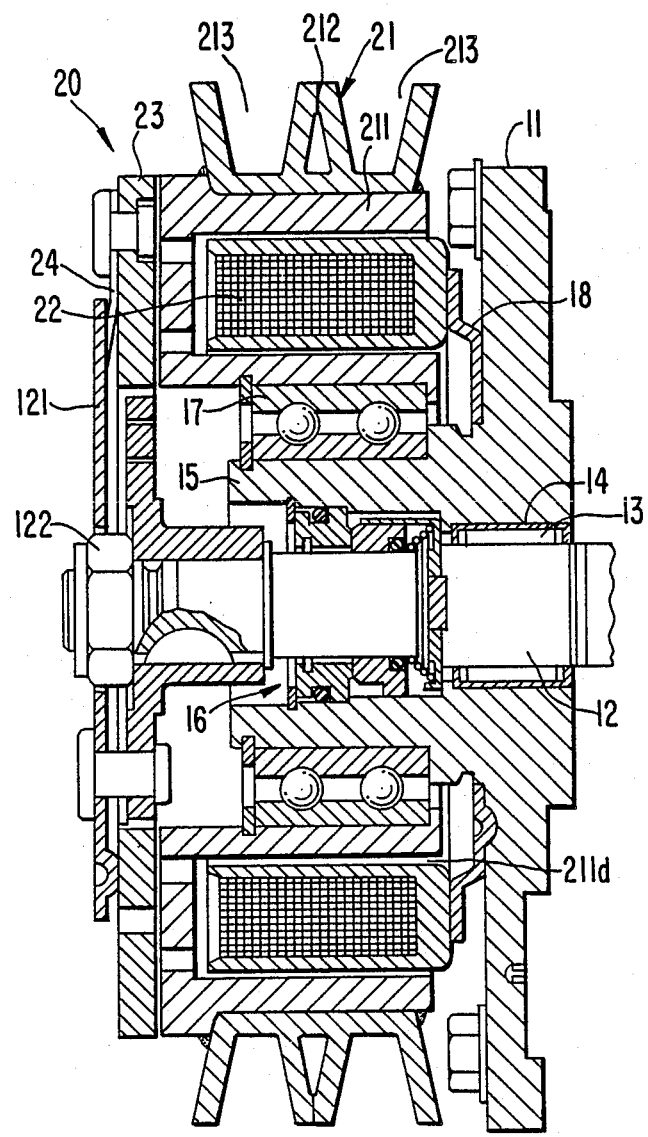
FIG. 1 is a sectional view of a prior art electromagnetic clutch.
Figure 2:
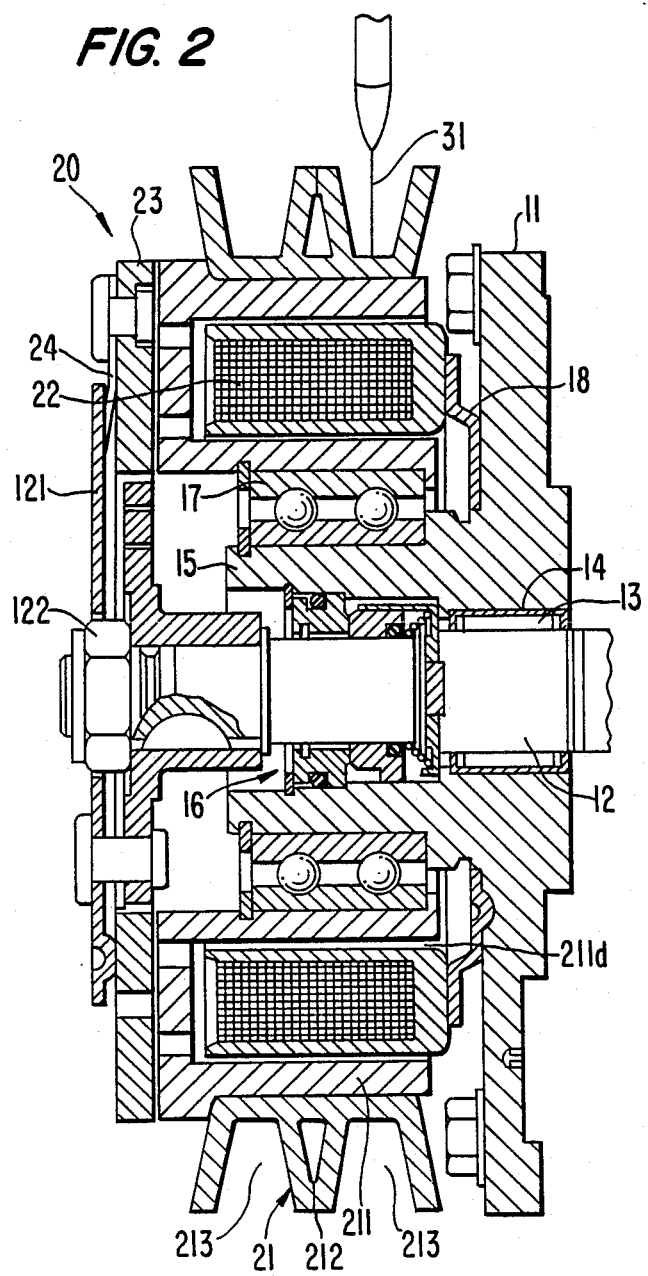
FIG. 2 is a sectional view of an electromagnetic clutch illustrating a prior art method of securing a pulley to a rotor.
Figure 3:
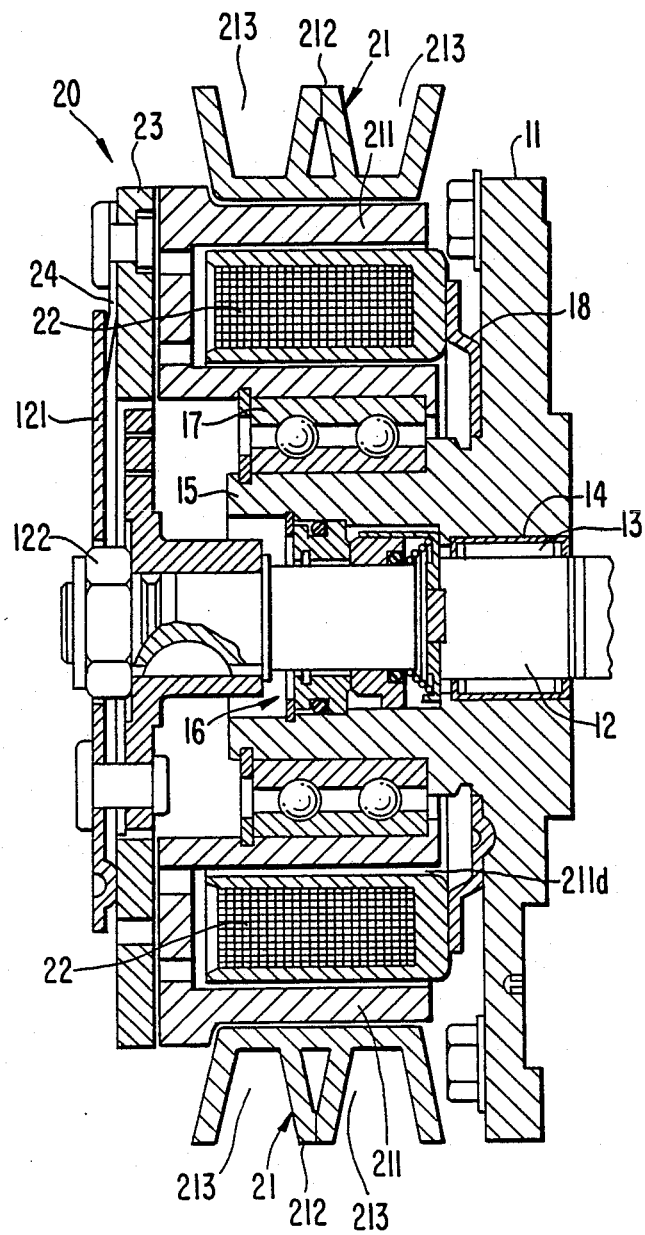
FIG. 3 is a sectional view of an electromagnetic clutch illustrating another prior art method of securing a pulley to a rotor.
Figure 4:
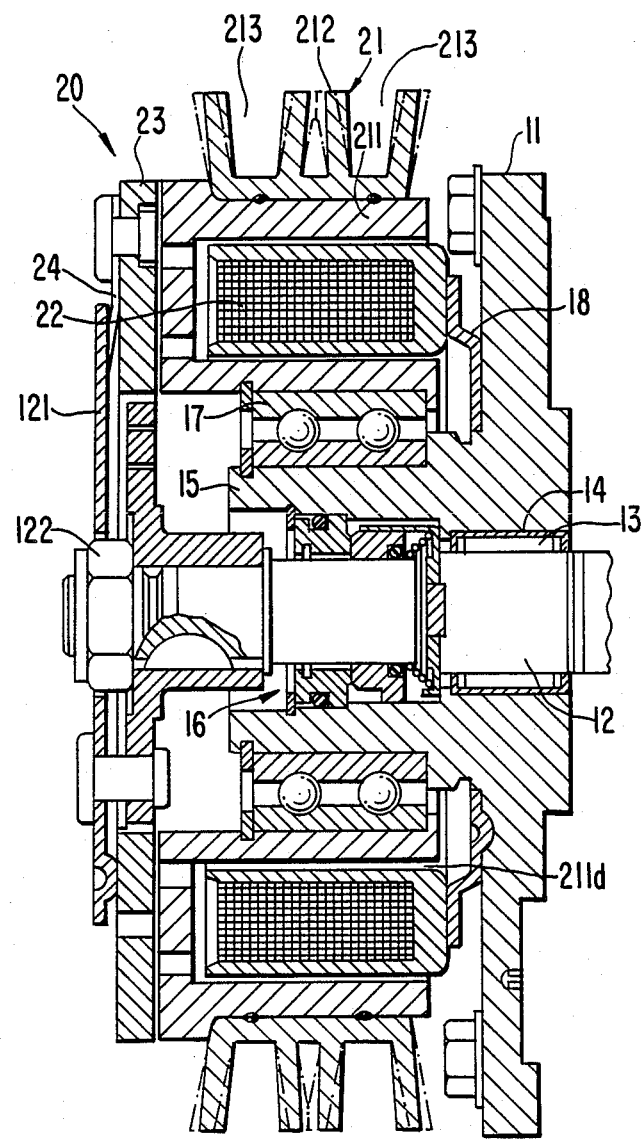
FIG. 4 is a sectional view of an electromagnetic clutch illustrating the effects of electron beam welding.
Figure 7:
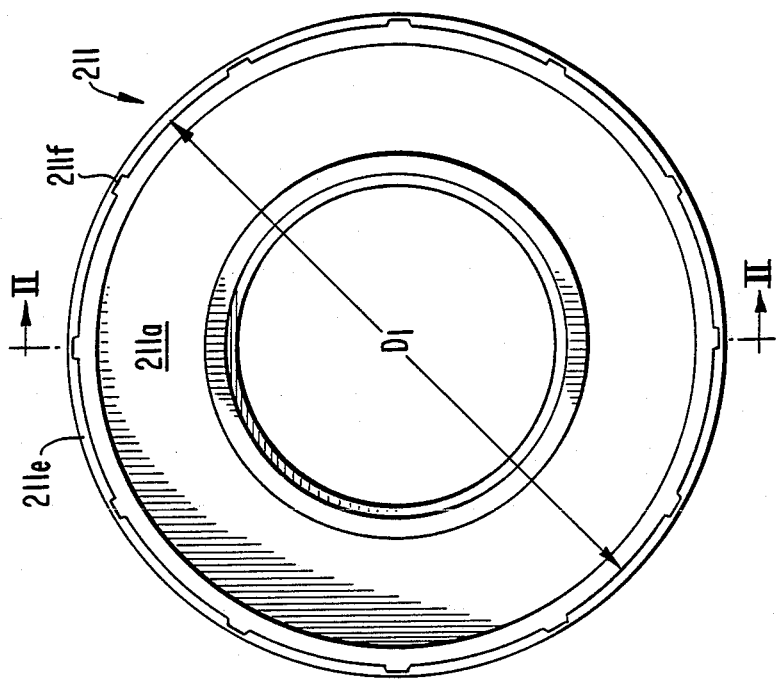
FIG. 7 is a side elevational view of a rotor in accordance with an embodiment of this invention.
Figure 8:
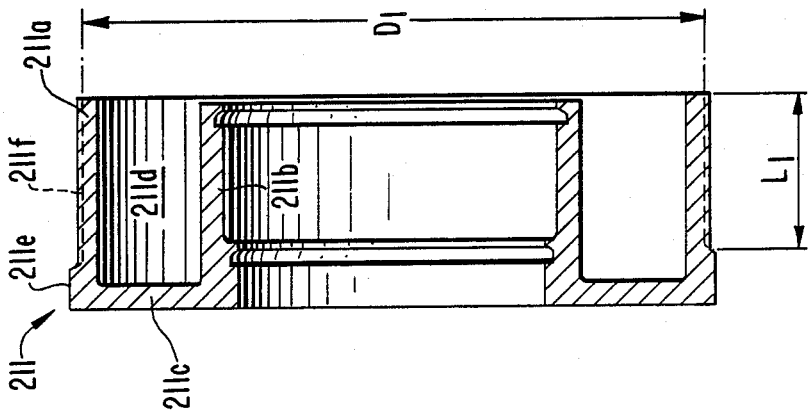
FIG. 8 is a cross-sectional view taken along line II—II of FIG. 7.

FIGS. 7 and 8 illustrate rotor 211. Rotor 211 comprises an outer peripheral wall 211a, an inner peripheral wall 211b and a ring-shaped portion 211c. An annular cavity 211d is formed by outer peripheral wall 211a, inner peripheral wall 211b and ring-shaped portion 211c. An annular electromagnet, such as shown in FIG. 1, is disposed within annular cavity 211d. A radial annular projection 211e outwardly radially projects from one end of outer peripheral wall 211a. A plurality of rectangular axial projections 211f project outwardly longitudinally from an outer peripheral surface of outer peripheral wall 211a. Projections 211f extend from radial annular projection 211e to the other end of outer peripheral wall 211a. Each axial projection 211f is located at circumferentially regular intervals, i.e., for example, an axial projection 211f may be disposed every 30° around the circumference for a total of 12 axial projections. These axial projections 211f may be formed by a press working.

Figure 9:
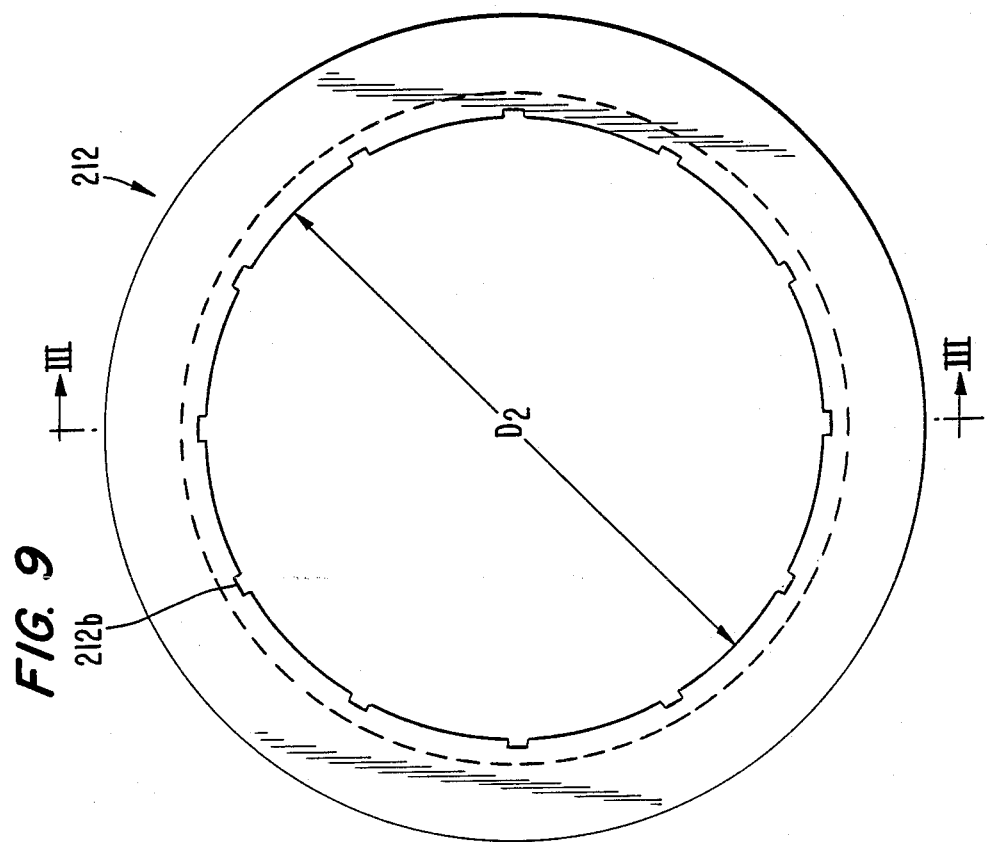
FIG. 9 is a side elevational view of a pulley in accordance with an embodiment of this invention.
Figure 10:
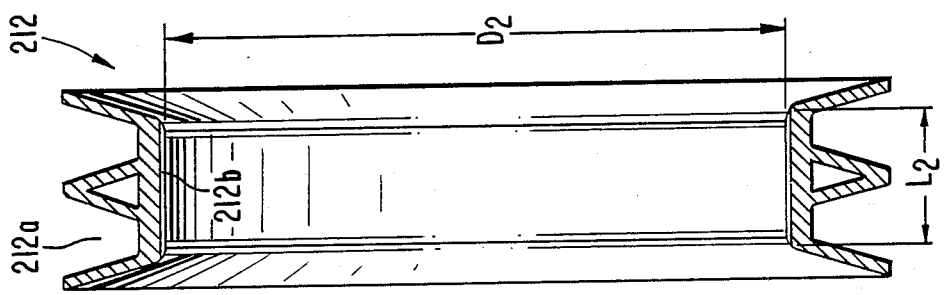
FIG. 10 is a cross-sectional view taken along line III—III of FIG. 9.

FIGS. 9 and 10 illustrate pulley 212. Pulley 212 includes two annular grooves 212a formed at an outer peripheral surface of pulley 212 for engaging a belt (not shown). A plurality of axial grooves 212b which are substantially complementary to axial projections 211f is formed at an inner peripheral surface of pulley 212. These grooves extend axially from one end to the other end of pulley 212. Each axial groove 212b is located at circumferentially regular intervals, i.e., for example an axial groove 212b may be disposed every 30° around the circumference for a total of 12 axial grooves. These axial grooves 212b may be formed by press working.

The dimensions indicated in FIGS. 7, 8, 9 and 10 have the following relations. $D_1$ represents an outer diameter of rotor 211 and is substantially equal to $D_2$ which represents an inner diameter of pulley 212. $L_1$ represents a longitudinal length of axial projections 211f and is slightly longer than $L_2$ which represents a longitudinal length of axial grooves 212b.

Securing pulley 212 to rotor 211 is accomplished by the following steps.

First, one end of each axial projection 211f is fitted to a corresponding axial groove 212b.

Next, pulley 212 is axially slid onto the outer peripheral surface of rotor 211, engaging each axial projection 211f to each axial groove 212b.

Then, pulley 212 is further slid onto rotor 211 until it is stopped by annular projection 211e.

Finally, several portions of the outer peripheral surface of rotor 211 are bent outwardly by a caulking tool (not shown) to secure pulley 212 against axial motion. For example, three bent portions A may be located every 120° of the circumference as shown in FIGS. 5 and 6. As a result, pulley 212 is firmly secured to rotor 211.

The invention is not limited to the embodiment disclosed above but may be varied in many ways. For example, although the disclosed embodiments show the axial grooves formed on the pulley and the axial projections formed on the rotor, one may also form the grooves on the rotor and the projections on the pulley. In addition, although twelve complementary grooves and projections are illustrated, the invention should not be understood as limited in this respect. Any number may be used so long as an effective engagement which prevents relative rotational movement is established. Also, the number of stoppers may be varied so long as an effective means against relative axial motion is established. In addition, a stopper that extends around the entire circumference of the rotor may be provided.

While the foregoing description is directed to only the presently preferred embodiments, it will be obvious to one of ordinary skill that numerous modifications may be made without departing from the true spirit or scope of the invention which is to be limited only by the appended claims.

We claim:

1. An attachment device for use in an electromagnetic clutch for attaching a pulley to an outer peripheral surface of a rotor, said device including:
   complementary engaging means respectively disposed on said rotor and said pulley for preventing relative rotational movement of said pulley and said rotor when said pulley is coupled to said rotor, said complementary engaging means comprising a plurality of axial grooves disposed on one of said rotor and said pulley and a plurality of axial projections formed on the other of said rotor and said pulley.

2. The device according to claim 1 further including:
   stopper means disposed at the outer peripheral surface of said rotor for preventing relative axial movement of said pulley and said rotor when said pulley is coupled to said rotor.

3. The device according to claim 1 wherein said complementary engaging means comprises at least three complementary axial grooves and axial projections.

4. The device according to claim 1 wherein said complementary engaging means are respectively disposed on the outer peripheral surface of said rotor and the inner peripheral surface of said pulley.

5. The device according to claim 4 wherein said complementary engaging means are disposed at regular intervals around the outer peripheral surface of said rotor and the inner peripheral surface of said pulley.

6. An attachment device for use in an electromagnetic clutch for attaching a pulley to an outer peripheral surface of a rotor, said device including:
   first engaging elements disposed on the outer peripheral surface of said rotor;
   second engaging elements disposed on the inner peripheral surface of said pulley, said second engaging elements being complementary to said first engaging elements so as to prevent relative rotational movement of said pulley and said rotor when said pulley is coupled to said rotor; and
   stopper means disposed on the outer peripheral surface of said rotor for preventing relative axial movement of said pulley and said rotor when said pulley is coupled to said rotor.

7. The device of claim 6 wherein one of said first engaging elements and said second engaging elements comprise a plurality of axial grooves and the other of said first engaging elements and said second engaging elements comprise a plurality of axial projections.

8. The device of claim 7 wherein said first and second engaging elements comprise at least three complementary axial grooves and axial projections.

9. A method for securing a pulley to an outer peripheral surface of a rotor in an electromagnetic clutch, said method comprising the steps of:
(a) respectively forming complementary engaging elements on said rotor and said pulley;
(b) coupling said pulley to said rotor in a manner so as to engage said complementary engaging elements such that relative rotational movement of said pulley and said rotor is prevented; and
(c) forming stopper means at the outer peripheral surface of said rotor for preventing relative axial movement of said pulley and said rotor when said pulley is coupled to said rotor.

10. The method according to claim 9 wherein step (c), said stopper means is formed by caulking.

11. The method according to claim 9 wherein said complementary engaging elements comprise a plurality of axial grooves disposed on one of said rotor and said pulley and a plurality of axial projections formed on the other of said rotor and said pulley.

* * * * *